(12) United States Patent
Bhattarai et al.

(10) Patent No.: US 11,404,875 B2
(45) Date of Patent: Aug. 2, 2022

(54) ENERGY MANAGEMENT SYSTEM, METHOD OF CONTROLLING ONE OR MORE ENERGY STORAGE DEVICES AND CONTROL UNIT FOR ONE OR MORE POWER STORAGE UNITS

(71) Applicant: Battelle Energy Alliance, LLC, Idaho Falls, ID (US)

(72) Inventors: Bishnu P. Bhattarai, Idaho Falls, ID (US); Kurt S. Myers, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 427 days.

(21) Appl. No.: 15/891,704

(22) Filed: Feb. 8, 2018

(65) Prior Publication Data
US 2018/0226800 A1 Aug. 9, 2018

Related U.S. Application Data

(60) Provisional application No. 62/456,418, filed on Feb. 8, 2017.

(51) Int. Cl.
*G05B 15/02* (2006.01)
*H02J 3/28* (2006.01)
(Continued)

(52) U.S. Cl.
CPC ............... *H02J 3/28* (2013.01); *G05B 15/02* (2013.01); *H02J 13/0006* (2013.01);
(Continued)

(58) Field of Classification Search
CPC .... H02J 3/28; H02J 13/0006; H02J 2003/003; H02J 2003/007; H02J 13/0062;
(Continued)

(56) References Cited

U.S. PATENT DOCUMENTS

| 3,906,242 A | 9/1975 | Stevenson |
| 5,274,571 A | 12/1993 | Hesse et al. |

(Continued)

FOREIGN PATENT DOCUMENTS

| CN | 103701143 A | 4/2014 |
| CN | 105098810 A | 11/2015 |

OTHER PUBLICATIONS

Bhattarai et al., "Reducing Demand Charges and Onsite Generation Variablility Using Behind-the-Meter Energy Storage", Institute of Electrical and Electronic Engineers (IEEE SusTech), (Oct. 2016) 7 pages.

*Primary Examiner* — Rocio Del Mar Perez-Velez
*Assistant Examiner* — Marzia T Monty
(74) *Attorney, Agent, or Firm* — TraskBritt (57) ABSTRACT

Systems, methods and apparatuses are provided for reducing peak energy demand and to smooth intermittent energy profiles from onsite variable energy sources and loads. Some embodiments use system level and device level analysis and optimization to adaptively adjust the operation of a behind the meter energy storage (BMES) to smooth out energy generation variabilities and follow a reference load signal, including at short time resolutions.

15 Claims, 7 Drawing Sheets

(51) Int. Cl.
  *H02J 13/00* (2006.01)
  *H02J 3/38* (2006.01)
  *H02J 3/00* (2006.01)

(52) U.S. Cl.
  CPC ....... *G05B 2219/2639* (2013.01); *H02J 3/003* (2020.01); *H02J 3/382* (2013.01); *H02J 13/00007* (2020.01); *H02J 13/0062* (2013.01); *H02J 2203/20* (2020.01); *Y02B 90/20* (2013.01); *Y04S 20/12* (2013.01)

(58) Field of Classification Search
  CPC ........ H02J 13/002; H02J 3/382; G05B 15/02; G05B 2219/2639; Y04S 20/12; Y02B 90/222
  See application file for complete search history.

(56) References Cited

U.S. PATENT DOCUMENTS

| | | |
|---|---|---|
| 5,632,146 A | 5/1997 | Foss et al. |
| 7,385,373 B2 | 6/2008 | Doruk et al. |
| 8,446,037 B2 | 5/2013 | Williams |
| 8,886,363 B2 | 11/2014 | Matthews et al. |
| 8,890,505 B2 | 11/2014 | Forbes, Jr. |
| 9,136,712 B2 | 9/2015 | Reineccius et al. |
| RE46,156 E | 9/2016 | Moore et al. |
| 9,489,701 B2 | 11/2016 | Emadi et al. |
| 9,509,176 B2 | 11/2016 | Carter et al. |
| 9,645,596 B1* | 5/2017 | Lee ..................... H02J 13/0013 |
| 2011/0106328 A1* | 5/2011 | Zhou ..................... G05B 13/024 700/291 |
| 2011/0166718 A1 | 7/2011 | Van Bael et al. |
| 2013/0030590 A1 | 1/2013 | Prosser |
| 2013/0166084 A1* | 6/2013 | Sedighy ................. G06Q 50/06 700/291 |
| 2015/0153394 A1 | 6/2015 | Carlson et al. |
| 2015/0207323 A1* | 7/2015 | Baba ........................ H02J 7/35 307/20 |
| 2016/0003918 A1* | 1/2016 | Wada ........................ H02J 3/32 320/134 |
| 2016/0118795 A1 | 4/2016 | Berkowitz et al. |
| 2016/0211668 A1 | 7/2016 | Becker et al. |
| 2016/0285267 A1 | 9/2016 | Stone et al. |
| 2016/0294182 A1 | 10/2016 | Li et al. |
| 2016/0329710 A1 | 11/2016 | Clifton |
| 2017/0005515 A1 | 1/2017 | Sanders et al. |
| 2017/0288455 A1* | 10/2017 | Fife ............. H02J 3/00 |
| 2018/0069398 A1* | 3/2018 | Kubota ................... H02J 3/383 |
| 2018/0269685 A1* | 9/2018 | Sugeno ................... H02S 20/30 |

\* cited by examiner

ENERGY MANAGEMENT SYSTEM, METHOD OF CONTROLLING ONE OR MORE ENERGY STORAGE DEVICES AND CONTROL UNIT FOR ONE OR MORE POWER STORAGE UNITS

CROSS-REFERENCE TO RELATED APPLICATION

This application claims the benefit under 35 U.S.C. § 119(e) of U.S. Provisional Patent Application Ser. No. 62/456,418, filed Feb. 8, 2017, the disclosure of which is hereby incorporated herein in its entirety by this reference.

STATEMENT REGARDING FEDERALLY SPONSORED RESEARCH OR DEVELOPMENT

The invention was made with government support under Contract No. DE-AC07-05-ID14517, awarded by the United States Department of Energy. The government has certain rights in this invention.

TECHNICAL FIELD

Embodiments of the present disclosure relate generally to systems, methods, and apparatuses for energy management. Some embodiments relate to techniques for using power storage to optimize supply of power to a load by variable power sources.

BACKGROUND

Variable energy sources, such as photovoltaics (e.g., solar power), wind-turbines, thermoelectric systems, etc., may be used for onsite energy generation, that is, energy generation local to a facility or device that is the load demanding power. However, some variable energy sources provide intermittent and unpredictable energy generation, and the energy demands of a load over time may experience spikes and dips. If the energy demand is misaligned to energy generation, then a variable energy source may not be reliable.

Many conventional energy distribution systems include access to an on-demand energy source, such as a utility grid. An on-demand energy source is just that: available on-demand. In a typical energy distribution system, the utility grid is "in front" of an electric meter, the load is "behind" the electric meter, and the meter tracks the kilowatt-hours (kWh) and kilowatt (kW) of electricity used by the load. The utility that operates the grid charges the facility responsive to a cost per-kWh and cost per-kW. At peak or high-demand times, the cost per-kWh and cost per-kW can increase, sometimes significantly. Loads with, or access to, both an on-demand energy source and a variable energy source that is behind-the-meter (so called "behind the meter energy source" or "BMES") may use energy management systems that optimize utilization of the variable energy sources during peak cost per kWh.

Some conventional energy management systems may use an energy storage device to compensate for misalignment of energy generation and demand, as well as to optimize for the cost per kWh curve. For example, a conventional energy storage device may charge from the variable energy source when the cost per kWh is low and discharge (to the load) when the cost per kWh is high. Operation of the energy storage device is limited by the availability of energy from the variable energy source. Some conventional energy management systems include scheduling capability that seeks to forecast variable energy generation and demand at a load, however, forecasts may suffer from large errors (for example, due to weather patterns) or many small errors that aggregate to a net cost.

Conventional energy distribution and management systems may have other drawbacks and deficiencies.

Accordingly, there is a need for integratable and scalable energy management systems and components, and techniques for operating the same, that do not suffer from some or all of the deficiencies of conventional energy distribution and management systems.

BRIEF SUMMARY

Embodiments of the present disclosure relate, generally, to an energy management system. The energy management system may include a system control unit and a device control unit. The system control unit may be configured to periodically determine a charge/discharge profile for an energy storage device during a demand time window responsive to an energy generation forecast model of a variable energy source and a demand forecast model for a load. The device control unit may be operably coupled to the energy storage device, and may be configured to control the energy storage device responsive to the charge/discharge profile and adaptively adjust the charge/discharge profile during the demand time window responsive to variations between forecasted net load and actual measured net load.

Other embodiments of the present disclosure relate, generally, to a method of adaptively controlling an energy storage device. The method of adaptively controlling an energy storage device may include receiving or calculating an operating schedule for an energy storage device, the operating schedule corresponding to a first operating period; adjusting the operating schedule during the first operating period responsive to one or more identified forecast errors; and controlling the energy storage device according to the adjusted operating schedule.

Other embodiments of the present disclosure relate, generally, to a control unit for adapting operation of a power storage unit. The control unit may include a communication interface and a processor. The communication interface may be configured to facilitate communication with other power management devices deployed in the power system; receive or calculate an operating schedule for a power storage unit, the operating schedule corresponding to a time interval; receive measurements related to performance of the power system during the time interval; and transmit control signals to the power storage unit. The processor may be configured to detect a difference between expected measurement and the actual measurements; adjust the operational schedule responsive to the detected difference; and generate the control signals during the time interval responsive to the adjusted operational schedule.

Deficiencies in existing energy management systems, the need for systems and components for energy management, and techniques for using the same, are generally described in: Bishnu P. Bhattarai, Kurt S. Myers, Jason W. Bush, *Reducing Demand Charges and Onsite Generation Variability Using Behind-the-Meter Energy Storage*, IEEE SusTech (2016), a copy of which is attached hereto in APPENDIX A, and the contents and disclosure of which is incorporated herein by reference in its entirety.

Advantages of the embodiments of the disclosure include integratability, scalability, flexibility, and interoperability. Embodiments of the energy management system and the techniques for using the same may be integrated into existing utility systems (e.g., nano-grid, microgrid, smart grid, distribution systems), including as software integrated to a control system (e.g., in "big" utility applications) or as separate micro-controllers (e.g., in "small" applications).

Further, embodiments of the disclosure provide advanced algorithms for peak-shaving and load shaping/following in different levels of electricity utilizations, including nanogrid, microgrid, and electrical distribution systems. Technical (decreases the need of peaking power generation, help grid congestion management) and economic benefits (cost saving to both consumers and electric utilities) to a few kilowatts nanogrids (e.g., residential household(s)/villages) up to a few megawatt microgrids (e.g., DOD bases, hospitals, commercial/industrial facilities, and electrical distribution systems) may be realized. Cost effective implementation of the peak shaving and load shaping/following techniques may be realized through integrating software with operational and control system (which are, for example, suitable for microgrid and smart grids applications) or by integrating using microcontrollers (which are, for example, suitable for nanogrid applications).

The foregoing and other features and advantages of the present disclosure will be made more apparent from the descriptions, drawings, and claims that follow. One of ordinary skill in the art, based on this disclosure, would understand that other aspects and advantages of the present disclosure exist.

BRIEF DESCRIPTION OF THE DRAWINGS

Purposes and advantages of the embodiments of the present disclosure will be apparent to one of ordinary skill in the art from the specification in conjunction with the appended figures.

APPENDIX A is an international conference article entitled, *Reducing Demand Charges and Onsite Generation Variability Using Behind-the-Meter Energy Storage* (IEEE SusTech 2016), by Bishnu P. Bhattarai, Kurt S. Myers, and Jason W. Bush.

DETAILED DESCRIPTION

Various embodiments may include elements described as implemented in a "computer" or a "computer system." Here, the terms "computer" and "computer system" are to be understood to include at least one non-transitory computer readable memory and at least one processing unit. In general, the memory will store, at one time or another, at least portions of an executable program code, and the processor(s) will execute one or more of the instructions included in that executable program code. It will be appreciated that the term "executable program code" and the term "software" mean substantially the same thing for the purposes of this description. It is not necessary to the practice of the various embodiments described herein that the memory and the processor be physically located in the same place. That is to say, it is foreseen that the processor and the memory might be distributed among physical pieces of equipment or even in geographically distinct locations.

The processing unit may be a general purpose "central processing unit," but may use a wide variety of other technologies. Specific purpose hardware may also be used to implement the embodiments described herein, including a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention. The processing unit may consist of a single core, or may be a multi-core processor that has two or more processing units that can operate executing instructions independently in parallel.

Users may interact with the computer systems described herein by way of graphical user interfaces (GUI) on a display and input devices such as touchscreens, keyboards, a computer mouse, touchpads, and the like.

Figure 1:
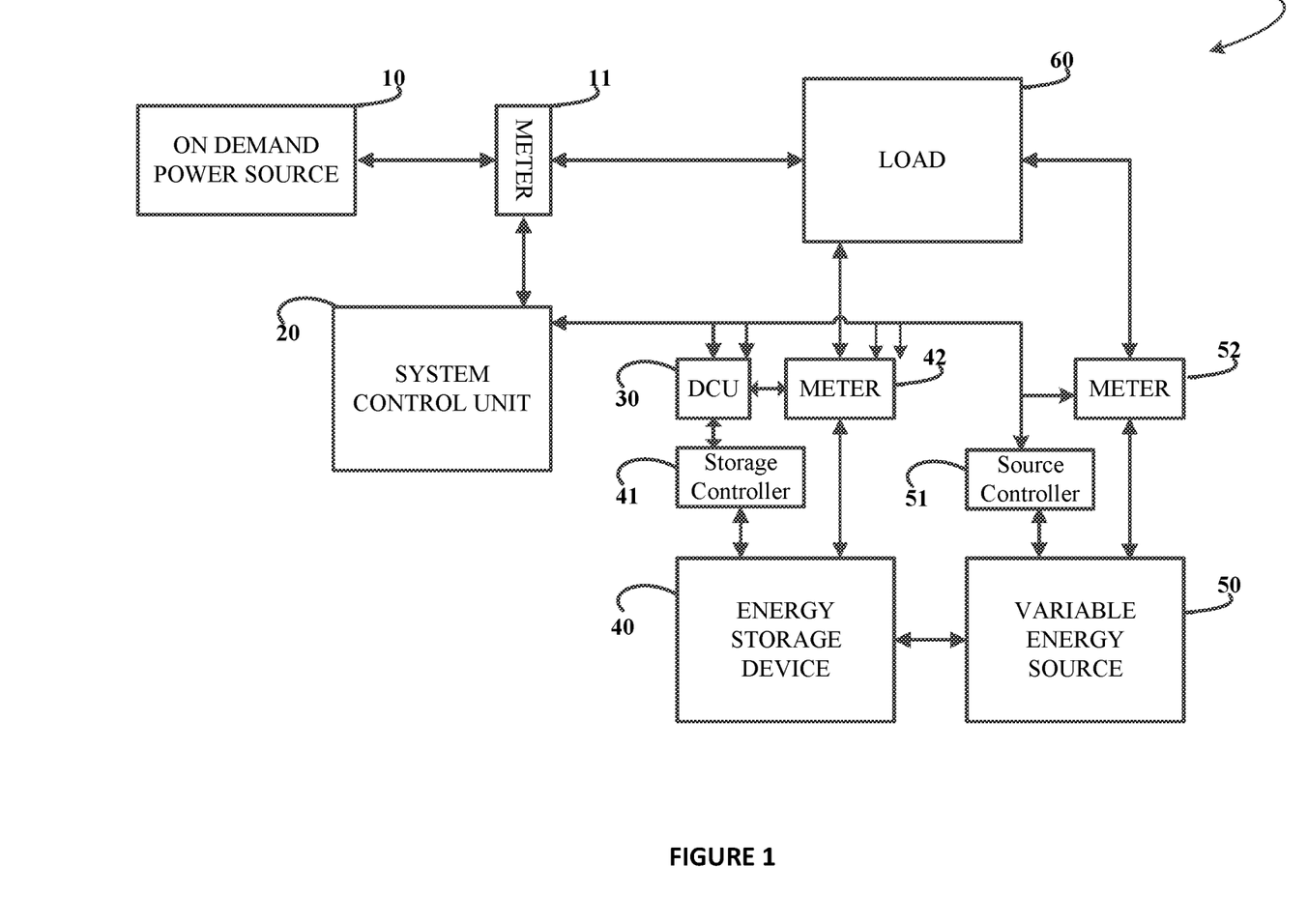
FIG. 1 is a block-diagram of an energy distribution system including energy management capabilities according to an embodiment of the disclosure.

FIG. 1 is a block-diagram of an energy distribution system 1 that includes an energy management system according to an embodiment of the disclosure. Embodiments of the energy distribution system 1 may implement various forms of wired and wireless communications among the components, including power-line communication (PLC) and home area network (HAN). Embodiments of the energy distribution system 1 may include a variable energy source 50, a load 60, and an on-demand power source 10—e.g., a utility grid. In various embodiments, the variable energy source 50 may comprise any intermittent power source, including but not limited to photovoltaic (e.g., solar), wind turbines, heat harvesting (e.g., thermoelectric, piezoelectric, etc.), or the like. Embodiments of the energy distribution system 1 may include multiple variable energy sources 50, though only a single source is illustrated in FIG. 1.

The variable energy source 50 may include or be operably coupled to a source controller 51 that is configured to manage distribution of electricity generated at the variable energy source 50. In one embodiment, the source controller 51 may be a computer, but it may also be implemented in hardware. In various embodiments, it may be integrated into a smart panel (not shown) for managing distribution of electricity. For example, the source controller 51 may operate a switch that controls the flow of electricity to the load 60 and the energy storage device 40. In some embodiments, the variable source controller 51 may be programmable with defined conditions and settings.

In various embodiments, the on-demand power source 10 may be a utility power grid that provides on-demand electricity to the load 60 "on-demand" for a cost per kWh. The electricity provided to the load 60 may be tracked by the electricity meter 11. In some embodiments, the electricity meter 11 may also facilitate communication between the load 60 and the on-demand power source 10.

The load 60 may be any device or facility that requests power, including a building, an HVAC, an appliance, a charging port for an electric vehicle, an installation, and more.

The energy management elements of the energy distribution system 1 may include the system control unit 20, the device control unit 30, and the energy storage device 40. By way of non-limiting example, in various embodiments, the energy storage device 40 may comprise one or more of electromechanical devices (e.g., batteries), mechanical storage devices (e.g., flywheel, hydraulic), electrical storage devices (e.g., capacitors, magnetic energy), and thermal energy storage. The storage controller 41 may be operably connected to the energy storage device 40. The storage controller 41 may be configured to control the operation of the energy storage device 40, including charging and discharging. In some embodiments, the storage controller 41 may be a computer, but it may also be implemented in hardware. In various embodiments, it may be integrated into a smart panel (not shown) for managing distribution of electricity. For example, the storage controller 41 may operate a switch that controls the flow of electricity to the load 60. In some embodiments, the storage controller 41 may be programmable with defined conditions and settings.

In various embodiments of this disclosure, meters 42 and 52 may track the electricity provided by the energy storage device 40 and the variable energy source 50 to the load 60, as well as energy transferred from the variable energy source 50 to the energy storage device 40. By way of non-limiting example, the meters 42 and 52 may be smart meters operating based on standards such as ANSI C12.18, IEC 61107, the open smart grid protocol, or TCP/IP.

Figure 2:
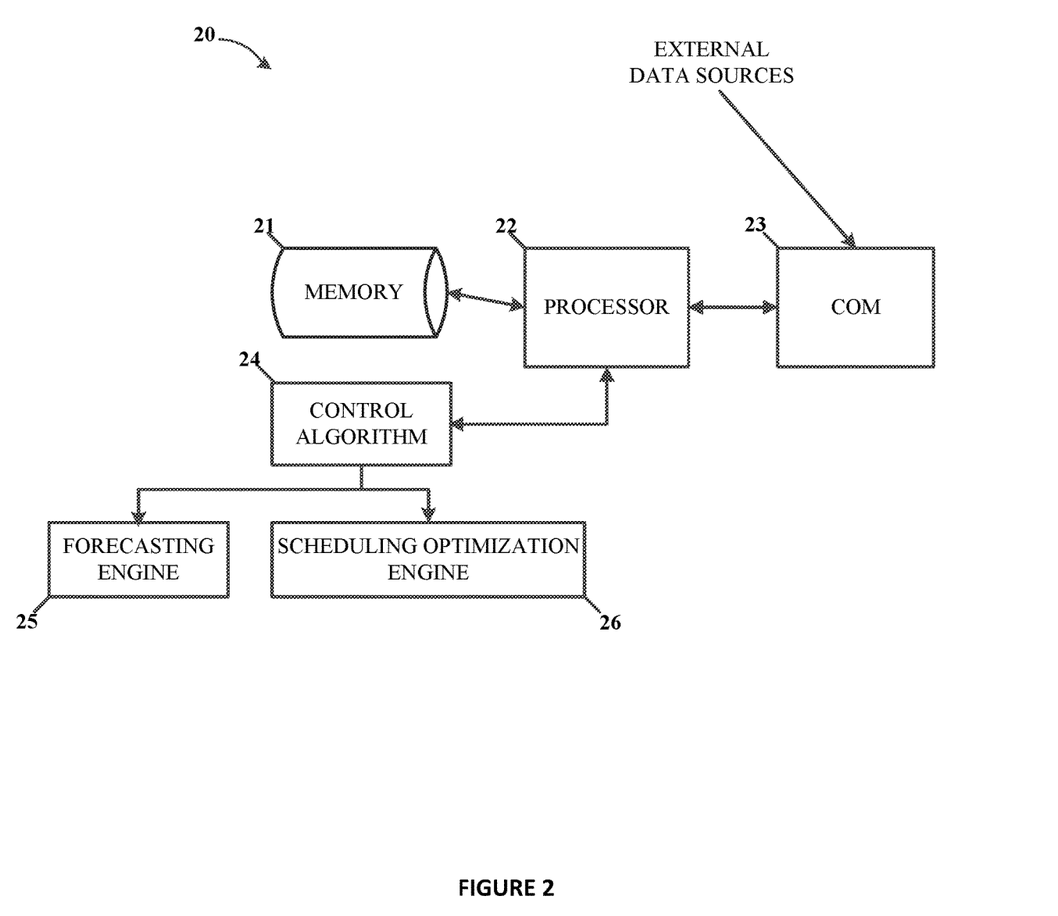
FIG. 2 is a block-diagram of a system level control unit for energy management according to an embodiment of the disclosure.

FIG. 2 illustrates a system control unit 20 in accordance with an embodiment of the disclosure. The system control unit 20 may be configured, among other things, to generate operational schedules for the energy storage device 40 (FIG. 1) for defined demand time windows. The system control unit 20 may include a memory 21, a processor 22, and a communications port 23 (COM 23). Various embodiments of the processor 22 may be configured to execute and operate according to control algorithm 24 to generate operational schedules. The control algorithm 24 may include a forecasting engine 25 and a scheduling optimization (SO) engine 26 in connection with generation of operational schedules.

As is described in this disclosure, one embodiment of an operational schedule comprises charge and discharge operations over a period of time. In one embodiment, a period of time may comprise a series of discrete time blocks (for example, over a 24-hour period, 48-hour period, week, month, year, etc.), and each time block may be associated with a charge or discharge operation. In one embodiment, a charge operation or a discharge operation may be associated with functions and parameters. Such parameters may affect various characteristics exhibited during a charge operation or discharge operation, for example, a rate of discharge or charge, a cost function, a state of charge, or the like.

Various embodiments of the disclosure may be described in terms of "algorithms" "module(s)" and "engine(s)," such as the control algorithm 24, forecasting engine 25 and scheduling optimization engine 26, which refer to the logic, embodied in hardware and/or software, to accomplish the features, functions, tasks or steps described herein. In the case of a general purpose computer, the "modules" and "engines" may be embodied in software classes and applications executed by processor cores, and while the modules or engines are executing the general purpose computer may be thought of as a special purpose computer or a specific purpose computer. The "modules" and "engines" may also relate to specific purpose hardware, including the firmware and machine code, controlling its operation.

Further, when embodied in software, the "modules" and "engines" that enables a computer system to act in accordance with the invention may be provided in any number of language forms including, but not limited to, original source code, assembly code, object code, machine language, compressed or encrypted versions of the foregoing, and any and all equivalents. Some examples of languages that may be used to write the software include, but are not limited to, C, C++®, JAVA®, MATLAB®, MINITAB®, EXPRESS, DRAKON, DYNA®, PYTHON, MOOSE, and RUBY. The software programs may be further translated into machine language or virtual machine instructions and stored in a program file in that form. The program file may then be stored on or in one or more of the articles of manufacture.

The forecasting engine 25 may be configured to provide ahead (e.g., 1 hour, 1 day, etc.) consideration of forecasted information of onsite energy generation and load demand for proactive scheduling of resources. The forecasting engine 25 may also be configured to receive various parameters and constraints, including those based on information from external data sources via the COM 23. In various embodiments, the forecasting engine 25 may be configured to receive and use historical data about the operation of the variable energy source 50 and demand at the load 60. In some embodiments, the historical information may be in the form of data over a defined period of time, average values, min and max values, and combinations thereof. The forecasting engine 25 may also be configured to use weather forecast data and metrological data to predict the power generation of the variable energy source 50 and storage state of the energy storage device 40. In one embodiment, the weather and meteorological data may be received from a national weather service at the COM 23.

Embodiments of the SO engine 26 may be configured to use various strategies to optimize and maximize the use of the energy storage device 40 in connection with the energy management of the energy distribution system 1. In some embodiments, the SO engine 26 may be configured to optimize energy management based on defined objectives. By way of non-limiting example, the defined objectives may include cost-minimization, renewable energy reliance maximization, demand reductions, and combinations thereof.

The processor 22 maybe configured to generate and provide the operational schedule for a defined demand time window/operational window to the COM 23 for transmission to the energy storage device 40 and storage controller 41.

Figure 3:
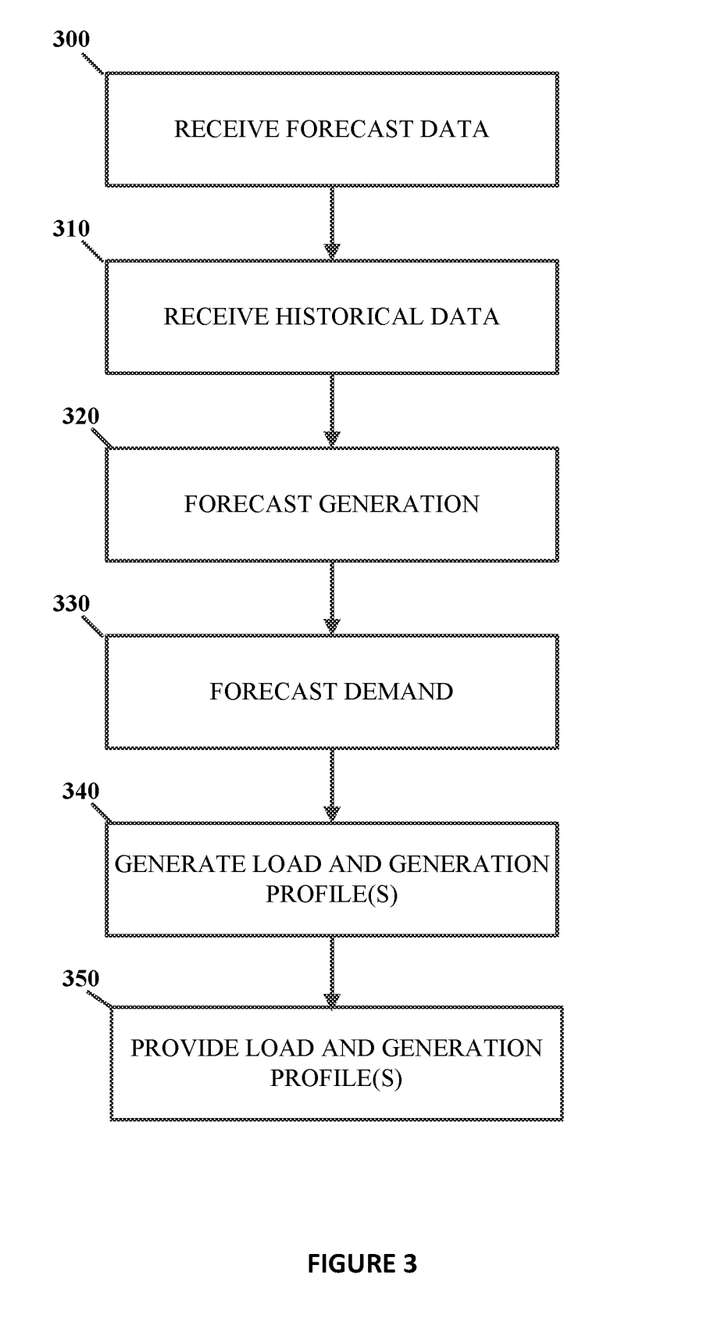
FIG. 3 is a flow-chart illustrating an operation of the system level control unit to forecast power generation and load demand in an energy distribution system according to an embodiment of the disclosure.
Figure 4:
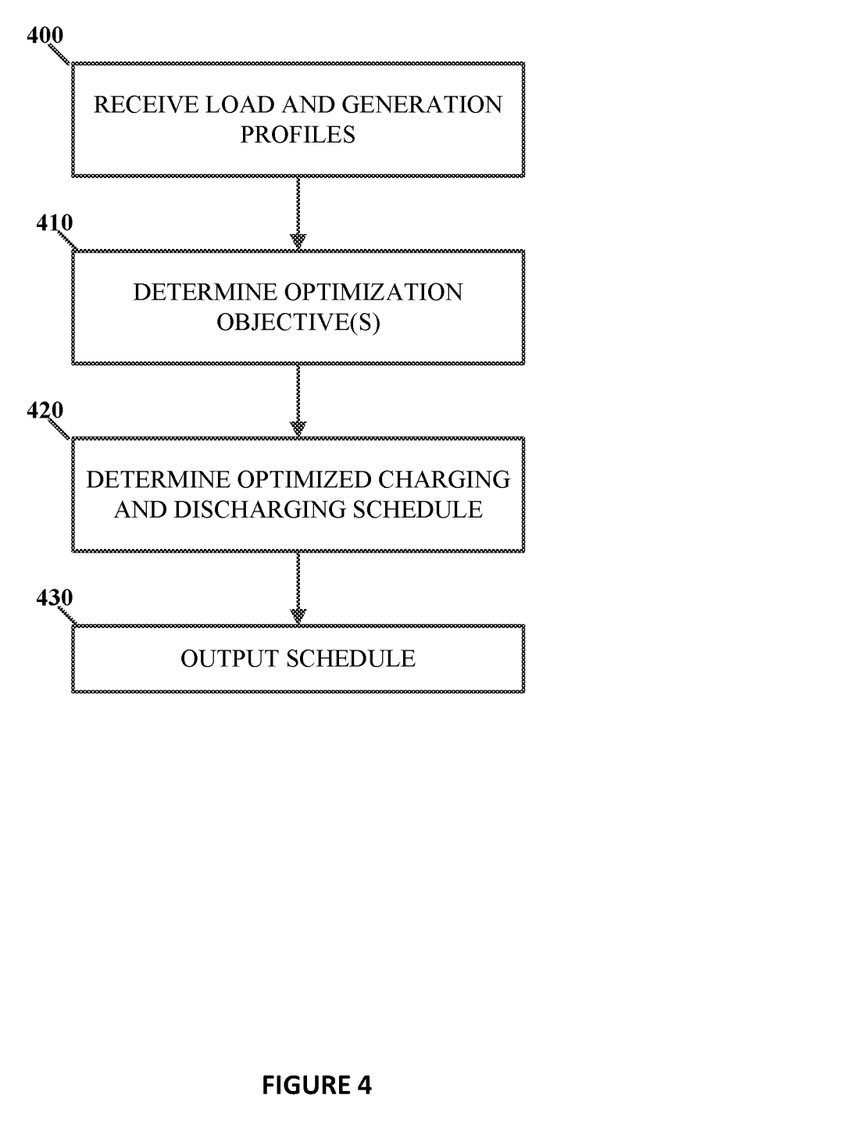
FIG. 4 is a flow-chart illustrating an operation of the system level control unit to generate an operational schedule for a BMES according to an embodiment of the disclosure.

FIGS. 3 and 4 illustrate an operation of the system control unit 20 according to an embodiment of the disclosure. The system control unit 20 receives forecast data in operation 300, which may include weather and meteorological data, and receives historical data about the variable energy source 50 and load 60 in operation 310. The processor 22 forecasts power generation at the variable energy source 50 in operation 320, and energy demand at the load 60 in operation 330, according to the control algorithm 24. The forecasts may for one or more defined demand time-windows.

In one embodiment, the forecasting engine 25 uses an auto regressive moving average (ARMA) to forecast the production and feeder demand for the variable energy source 50 and load 60. Auto regression may be modeled as a linear function of order p to describe a stochastic process and auto-correlations of past data, and moving average may be modeled as a function of order q to estimate progress and trend on the direction of the stochastic function. The forecasted parameter y(t) may be mathematically modeled as Eq. 1:

$$y(t) = \sum_{i=1}^{p} \phi_{p,i} y(t-i) + \sum_{k=1}^{q} \theta_{q,k} e(t-k) + e(t) \tag{Eq. 1}$$

where p and q are the auto regressive and lagged forecast errors terms, $\Phi_{p,i}$ and $\Phi_{q,k}$ are parameters calculated based on p and q, and e(t) is a zero-mean stationary white Gaussian noise. Moreover, (t−i) and (t−k) are backshift operators with delays i and k. In one embodiment, the ARMA model maybe constructed in MATLAB® from which a binary file/executable is generated.

A load profile and a power generation profile are generated in operation 340 based on the forecasts made in operations 320 and 330. In one embodiment, the profiles are forecasted values in a vector of time-slots. In another embodiment, the profiles are time functions. The load and power generation profiles are made available to the SO engine 26 in operation 350.

The SO engine 26 receives the load and power generation profiles in operation 400, and determines optimization objectives in operation 410. By way of non-limiting example, optimization objectives may include one or more of minimizing the cost-per kWh at the load 60, reducing overall demand by the load 60 at the on-demand power source 10, maximizing the draw on the variable energy source 50, and combinations thereof. In further embodiments, particular strategies may also be defined to achieve the defined objective. By way of non-limiting example, if the objective is cost reduction, peak shaving may be defined as the strategy. In various embodiments, users may define optimization objectives and strategies at the system control unit 20 for the SO engine 26.

A control schedule for the energy storage device 40 may be determined in operation 420 based on the profiles and defined objectives. In one embodiment, the SO engine 26 uses an objective function associated with the selected objectives, and minimizes the objective function to determine the control schedule. Minimization of the objective function may be defined mathematically according to Eq. 2:

$$\text{Min. } C_i * \frac{1}{K_T} \sum_{i=1}^{N} (P_i^{BL} - P_i^{PV} + P_{i,Chg/Dsg}^{BT}) \cdot \delta t \tag{Eq. 2}$$

$P_i^{BL}$ and $P_i^{PV}$ are the forecasted values of base load and onsite PV generation (i.e., the variable power source generation, which in this example is a photovoltaic), $P_{i,Chg/Dsg}^{BT}$ is the energy storage device 40 charging/discharging schedules to be determined, $C_i$ is the optimization coefficient, $K_T$ is the normalization constant used to express time in hours, N is the total number of time slots, and i represents the time-slot index. If cost reduction is an objective, $C_i$ may be real-time electricity prices and the result of the function is to reduce the total electricity costs. If the demand reduction is the objective, $C_i$ will be coefficients that should be a function of the loading conditions in the network.

By way of example, if demand charge reduction by peak shaving is the strategy, the coefficients $C_i$ may be defined mathematically by Eq. 3:

$$C_i = \begin{cases} \in & P_{i,Net}^F = P_{min}^F \\ \frac{P_{i,Net}^F - P_{min}^F}{P_{Peak}^F - P_{min}^F} & P_{min}^F < P_{i,Net}^F < P_{Peak}^F \\ 1 & P_{i,Net}^F = P_{Peak}^F \end{cases} \tag{Eq. 3}$$

The net power ($P_{i,Net}^F$) equals the algebraic sum of the total demand and PV generation as defined mathematically in Eq. 4:

$$P_{i,Net}^F = P_i^{BL} - P_i^{PV} \tag{Eq. 4}$$

$P_{Peak}^F$ and $P_{min}^F$ are the forecasted peak and minimum load periods for the next day. Moreover, $\notin$ (Eq. 3) is a small positive number designed to enable charging the energy storage device 40 during low loading periods and/or high PV generation periods. Further, higher values of $C_i$'s during peak periods and/or low PV generation enables the energy storage device 40 to discharge during those periods. This approach effectively reduces the peak demands on the energy distribution system 1.

In various embodiments, the SO engine 26 is configured to determine the operational schedule for the energy storage device 40 based on one or more technical and user defined constraints/requirements. For example, the energy storage device's 40 charging/discharging schedule may be constrained by a battery's operational boundaries. Constraints may also related to user defined demand regulation/reduction.

Equations 5 through 11 define, mathematically, constraints some or all of which may be considered by the scheduling optimization (SO) engine 26 in determining operational schedules of the energy storage device 40. One of ordinary skill in the art will understand that additional constraints are within the scope of this disclosure, as well as modifications to the definitions of the constraint described herein.

In one embodiment, for each time step ($\forall i=1: N$), the energy storage device 40 may be constrained by ramping rates, charging/discharging power, and state of charge (SOC) limits as defined in Eq. 5, Eq. 6 and Eq. 7:

$$0 \leq P_{i,Chg}^{BT} < P_{Max}^{BT} - P_{Max}^{BT} < P_{i,Dsg}^{BT} \leq 0 \tag{Eq. 5}$$

$$R^{Up} < \Delta P_{i,Chg/Dsg}^{BT} \leq P_{Max}^{BT} \tag{Eq. 6}$$

$$R^{Dn} < \Delta P_{i,Chg/Dsg}^{BT} \leq P_{Max}^{BT}$$

$$SOC_{Min} \leq SOC_i \leq SOC_{Max} \tag{Eq. 7}$$

$$SOC_{i+1} = SOC_i + \frac{P_{i,Chg/Dsg}^{BT} \delta t}{BMES_{Cap}}$$

$P_{i,Chg/Dsg}^{BT}$ is the charging/discharging power of BMES that is subjected to its maximum rated power $P_{max}^{BT}$, $R^{Up/Dn}$ is the allowable up/down ramping rate, $SOC_i$ is the SOC of energy storage device 40 at $i^{th}$ time slot subjected to its minimum and maximum limits $SOC_{Min/Max}$, and $BMES_{Cap}$ is the energy storage device 40 energy throughput. The first set of constraints defined in Eq. 5 is may keep the charging/ discharging of the energy storage device 40 within an allowable rated power. The second set of constraints defined in Eq. 6 may prevent the energy storage device 40 from ramping up/down for smaller deviations on forecasted and actual net load profiles to preserve battery health. The third set of constraints defined in Eq. 7 may keep the SOC within predefined boundaries. Particularly, constraints defined in Eq. 6 and Eq. 7 may keep energy storage device 40's operational capability in "good" condition (e.g., minimize degradation) as well as to operate the energy storage device 40 in the operating regimes (e.g., state of charge range) that have higher efficiency. The operating regime may generally be selected based on a particular battery technology.

In another embodiment, energy storage device 40 may be constrained by equality constraints to meet customer requirement/comfort as defined in Eq. 8:

$$SOC_{i=1} = SOC_{i=N} \quad \text{(Eq. 8)}$$

$SOC_{i=1}$ is the SOC of energy storage device 40 at the beginning of the day and $SOC_{i=N}$ is the SOC at the end of the day. This constraint may maintain the total energy stored by the energy storage device 40 to a constant value (or above a threshold) at the end of the day.

In another embodiment, constraints may be defined as demand reduction targets as defined in Eq. 9:

$$(P_i^{BL} - P_i^{PV} + P_{i,Chg/Dsg}^{BT}) \le (\alpha + \epsilon_1) \cdot P_{Peak}^F$$

$$(P_i^{BL} - P_i^{PV} + P_{i,Chg/Dsg}^{BT}) \ge (\beta + \epsilon_2) \cdot P_{i,Net}^F \quad \text{(Eq. 9)}$$

The variables $\alpha$ are $\beta$ are user defined targets for reducing the peak demand and filling the valley respectively. Variables $\epsilon_1$ and $\epsilon_2$ are the relaxation variables. $P_{Peak}^F$ is the day-ahead forecasted peak load. This constraint defined in Eq. 9 is an additional option for a power storage owner/user to set demand reduction targets. In one embodiment, if user-set targets do not meet (i.e., optimization does not converge), then the SO engine 26 may relax the user requirements set points and determines an optimal power storage schedule to bring about convergence (e.g., a "best available fit" approach).

In another embodiment, to satisfy the user requirements the SO engine 26 may constrain the optimization by defining different blocks of time for charging and/or discharging. For example, the energy storage device 40 may be prevented from discharging during certain time slots (e.g., low load, minimum price, or maximum PV generation) and vice versa. Such a constraint is defined in Eq. 10 and Eq. 11:

$$P_{i,Chg/Dsg}^{BT} \ge 0 \quad t_1 < i < t_2 \quad \text{(Eq. 10)}$$

$$P_{i,Chg/Dsg}^{BT} \le 0 \quad t_3 < i < t_4 \quad \text{(Eq. 11)}$$

Variables $t_i$ through $t_4$ are time slots during which the energy storage device 40 is prevented from, or forced to, charge or discharge. For example, Eq. 10 defines a time interval $t_i$ through $t_2$ during which the energy storage device 40 is forced to charge. Eq. 11 defines a time interval $t_3$ through $t_4$ during which the energy storage device 40 is forced to discharge. It should be noted that multiple time periods can be set to direct charging/discharging of the energy storage device 40 per user requirements.

It will be apparent to one of ordinary skill in the art that the embodiments described above with reference to Equations 5 through 11, involve modeling the operational schedule of the energy storage device 40 as a solution to an optimization problem. In the various embodiments described herein, the SO engine 26 may use a dual-simplex solver in the optimization toolbox of MATLAB®.

Optimization results that may be characterized as an optimal operational schedule for the energy storage device 40 may be obtained based on the relevant objectives, strategies, and constraints—in the embodiments described above, the constraints that reduce the peak demand, and in turn the demand charges for BMES users. The system control unit 20 outputs the operational schedule to the storage controller 41 in operation 430.

Figure 5:
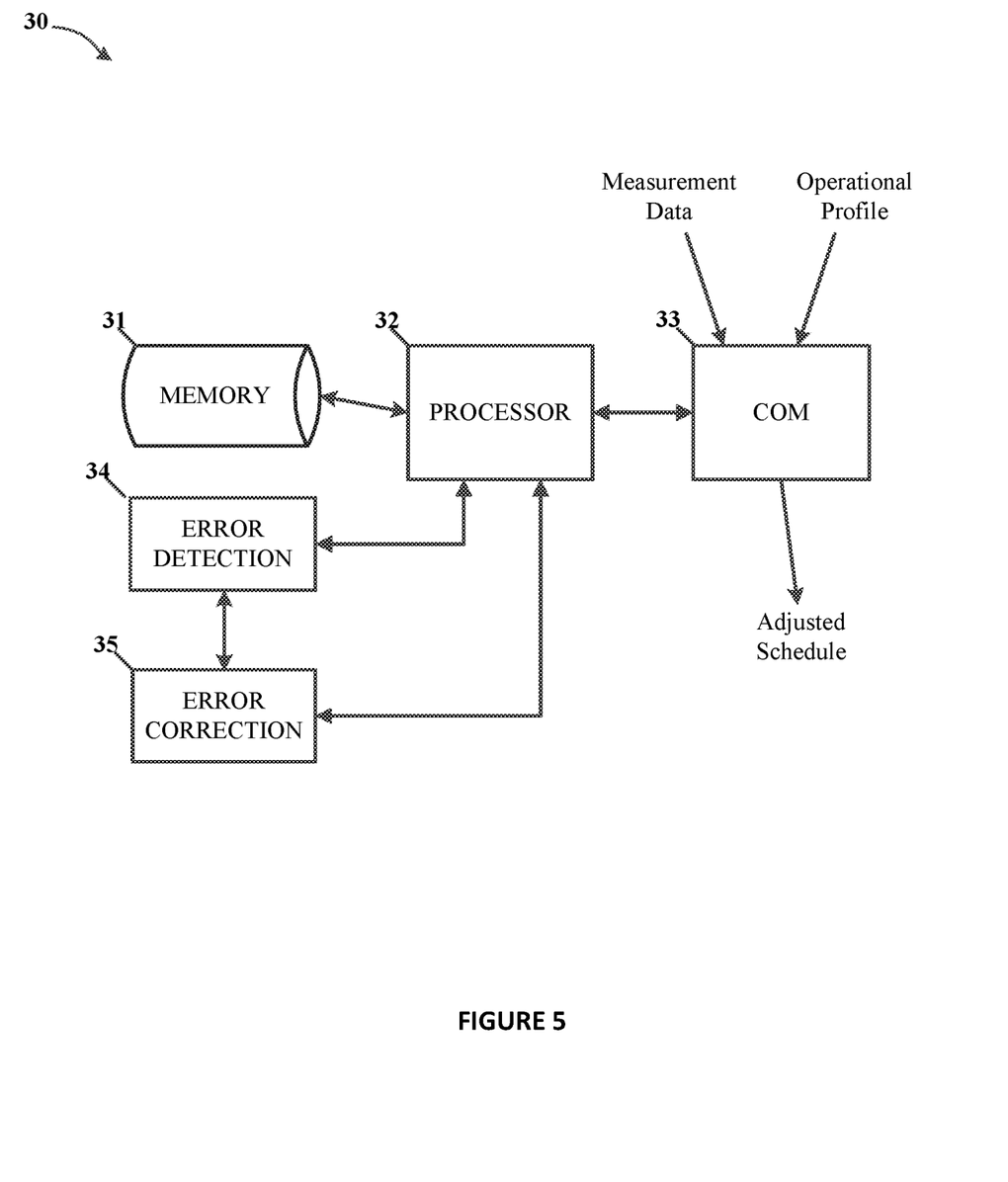
FIG. 5 is a block-diagram of a device level control unit for energy management according to an embodiment of the disclosure.

FIG. 5 illustrates a device control unit (DCU) 30 according to an embodiment of the disclosure. The DCU 30 may be operationally coupled to the storage controller 41 and communicatively coupled to the system control unit 20, the meter 11, the meter 42, and the meter 52. The DCU 30 may include a memory 31, a processor 32, a communication port (COM) 33, an error detection engine 34, and an error correction engine 35.

Embodiments of the DCU 30 may be configured to operably control the energy storage device 40 by adjusting actual operation of the energy storage device 40 to cope with uncertainties that may occur due to forecasting errors or other unforeseen/unaccounted contingencies. In one embodiment, the DCU 30 may be configured to determine control parameters, including over time, to compensate for small spikes due to load/generation variations that, for example, may contribute to an increase in peak demand and demand charges.

Embodiments of the DCU 30 may be configured to update an operational schedule for the energy storage device 40 responsive to observed measurements related to the energy distribution system 1. For example, the DCU 30 may update an operational schedule of the energy storage device 40 responsive to differences between the measured net load and the forecasted net load. Turning to FIG. 5, the processor 32 may be configured to receive measurement data, compare and detect errors in the forecasting according to the error detection engine 34, and generate a corrected operational schedule for the energy storage device 40 according to the error correction engine 35. The adjusted schedule may be provided for control of the energy storage device 40, in one embodiment, to the storage controller 41.

Figure 6:
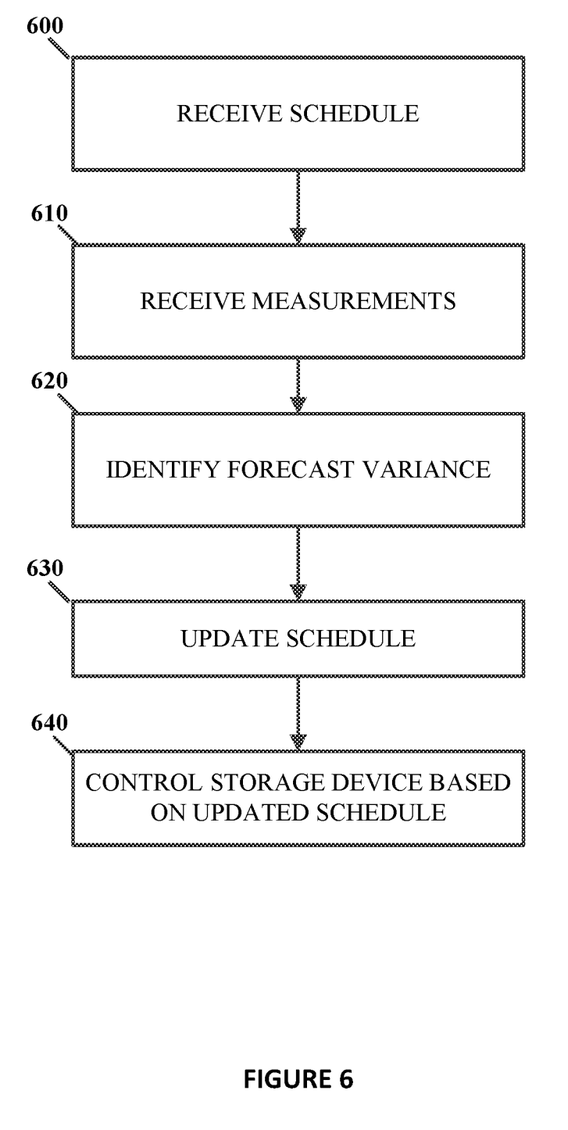
FIG. 6 is a flow-chart illustrating an operation of the device level control unit to adaptively adjust the operational schedule for a BMES according to an embodiment of the disclosure.

FIG. 6 illustrates an operation of the DCU 30 according to an embodiment of the disclosure. The DCU 30 receives the operational schedule for the energy storage device 40 in operation 600. In one embodiment, the DCU 30 may also receive energy generation forecast models and demand forecast models. The DCU 30 receives measurement data for the energy distribution system 1 in operation 610. The measurement data may include the net power, or data based on which the net power may be calculated. In some embodiments, the measurement data may be provided by one or more of the smart meters 11, 42 and 52 (FIG. 1). In some embodiments, the measurement data may be updated periodically, for example, 1-minute intervals, during the demand time window corresponding to the operational schedule. The frequency of updates may be set based on a desired sensitivity. In other embodiments, the measurement data may be measured continuously in real-time or near real-time.

The processor 32 operating according to the error detection engine 34 identifies variance between the actual measured and forecasted values of one or more of net power/net load, state of charge of the energy storage device 40, and combinations thereof, in operation 620. The processor 32 operating according to the error correction engine 35 adaptively adjusts the operational schedule 630 responsive to the measured values, in one embodiment using the same optimization techniques as the system control unit 20. The updated operational schedule 640 for the energy storage device 40 may be defined mathematically in terms of Eq. 11:

$$P_{Chg/Dsg}^{BT,Upd} = P_{Chg/Dsg}^{BT} + \frac{1}{K_T} \int_a^b (P_{Net}^A - P_{Net}^F)\delta t \quad \text{(Eq. 12)}$$

$P_{Chg/Dsg}^{BT,Upd}$ is the updated reference control signal (i.e., operational schedule) computed through the difference between the actual measured and forecasted values of the net power, and a and b are the time interval in which the operational schedules are updated, for example, a and b may be set to a time interval of 1 minute.

Adaptively adjusting the operational schedule during the demand time window may effectively smooth out energy generation variabilities in smaller time resolution, as well as effectively follow the reference load signal that may stem from the local and/or upstream grid requirements.

Figure 7:
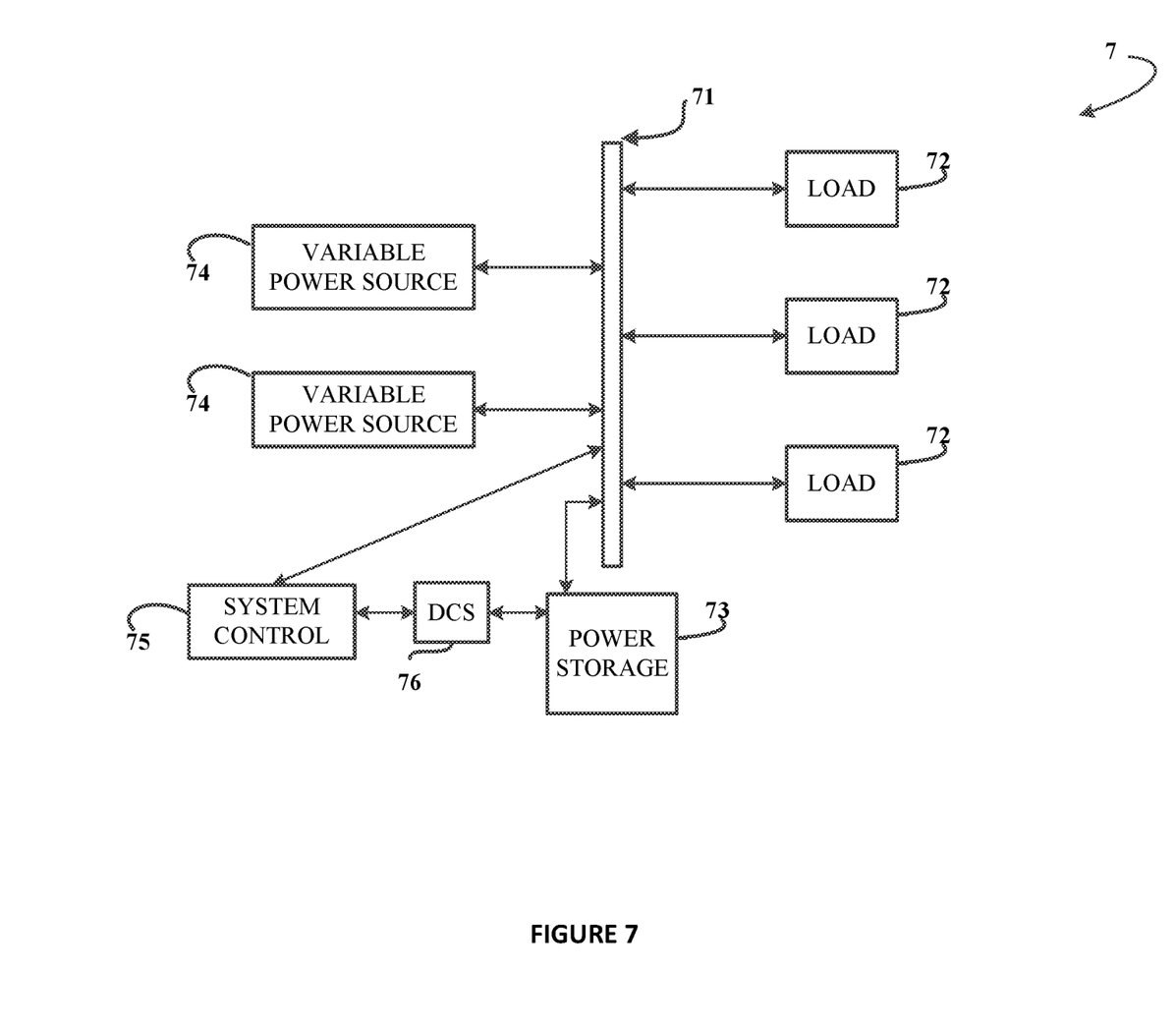
FIG. 7 is a block-diagram of an energy distribution system including energy management capabilities according to an embodiment of the disclosure.

FIG. 7 illustrates an energy distribution system 7 according to an exemplary embodiment of the disclosure. The energy distribution system 7 includes variable power sources 74, loads 72, a smart panel 71, a system control 75, power storage 73, and a device control unit (DCU) 76. The embodiment of the energy distribution system 7 illustrated in FIG. 7 does not include an on-demand energy source.

Embodiments of the system control 75 and DCU 76 may use the techniques described with reference to system control unit 20 and DCU 30, provided that the system control 75 and DCU 76 may be configured to optimize operation of the variable power sources 74 in connection with power storage 73 to meet the peak load demands of the energy distribution system 7. In one embodiment, cost per kWh is not an optimization coefficient.

Memories, such as memory 21 and memory 31, may be arranged inside and outside a computer. For example, in a network, the system memory may include (or be part of) a distributed storage system that provides both storage and file-system, such as network-attached-storage (NAS), or a distributed storage system that provides only storage, such as a storage-area-network (SAN). In the case of NAS, it may include software capable of file management services, including, without limitation, FreeNAS™, NASLite™, and NexentaStor™. The NAS may contain one or more hard disks, arranged into logical, redundant storage containers or RAID arrays. The NAS may use one or more file-based protocols including, without limitation, Network File System (NFS), Windows NT™ File System (NTFS), File Allocation Table (FAT), Server Message Block/Common Internet File System (SMB/CIFS), or Apple Filling Protocol (AFP).

The information stored on a memory may be stored in a database. The particular architecture of the database may vary according to the specific type of data, mode of access of the data, or intended use of the data stored in the database; including, without limitation, a row-oriented data-store architecture, a column-based database management system, extensible-markup language, a knowledgebase, a frame database, or combinations thereof. A database management system (DBMS) may organize the storage of the data in the database, tailored for the specific requirements of the present system. The DBMS may use any number of query languages to access the database, including, without limitation, structured query language (SQL). In the case of SAN, embodiments of the invention may use any number of protocols to communicate between server and storage, including, without limitation, the SCSI protocol, HyperSCSCI protocol, iSCSI protocol, ATA over Ethernet, Fibre channel Protocol, and Fibre Channel over Ethernet.

Various embodiments of the disclosure described with reference to FIGS. 1 through 9, above, may be implemented to facilitate user interaction via a user interface, such as a graphical user interface, invocable by an application program. A user interface may be understood to mean any hardware, software, or combination of hardware and software that allows a user to interact with a computer system. For the purposes of this discussion, a user interface will be understood to include one or more user interface objects. User interface objects may include display regions, user activatable regions, and the like.

A user interface may include input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to a processing unit through a user input interface that is coupled to the system bus, but may be connected by other interface and bus structures, such as a parallel port, a virtual port, game port or a universal serial bus (USB) type interface.

A display region is a region of a user interface which displays information to the user. A user activatable region is a region of a user interface, such as a button or a menu, which allows the user to take some action with respect to the user interface.

A user interface may be invoked by an application program. When an application program invokes a user interface, it is typically for the purpose of interacting with a user. However, it is not necessary that an actual user ever interact with the user interface. It is also not necessary, for the purposes of this invention, that an interaction with the user interface be performed by an actual user. That is to say, it is foreseen that the user interface may have interaction with another program, such as a program created using macro programming language statements that simulate the actions of a user with respect to the user interface.

The graphical user interface may provide a user feedback. Based on the feedback, the user may select, input, and/or accept additional parameters (which includes user defined constraints) or to change parameter values. Parameters may also be added or changed automatically.

A user may enter commands and parameters at a computer terminal via a user interface, including a graphical user interface such as is described herein.

Embodiments of the system control unit and device control unit described with reference to FIGS. 1-7 may be embodied in a computer program product supplied on any one of a variety of computer-readable media. The computer program product may be embodied in computer language statements of the types already described herein.

One of ordinary skill in the art will appreciate that "media," "medium," "computer-readable media," or "computer readable medium" as used here, may include a diskette, a magnetic tape, a digital tape, a compact disc, an integrated circuit, a ROM, a CD, DVD, Blue-ray, a cartridge, Flash memory, PROM, a RAM, a memory stick or card, or any other non-destructive storage medium useable by computers, including those that are re-writable.

Although the enabling software might be "written on" a disc, "embodied in" an integrated circuit, "carried over" a communications circuit, "stored in" a memory chip, or "loaded in" a cache memory, it will be appreciated that, for the purposes of this application, the software will be referred to simply as being "in" or "on" the computer-readable medium. Thus, the terms "in" or "on" are intended to encompass the above mentioned and all equivalent and possible ways in which software can be associated with a computer-readable medium.

For the sake of simplicity, therefore, the term "computer program product" is thus used to refer to a computer readable medium, as defined above, which has on it any form of software to enable a computer system to operate according to any embodiment of the invention. Software applications may include software for facilitating interaction with software modules, including user interface and application programming interfaces. Software may also be bundled, especially in a commercial context, to be built, compiled and/or installed on a local computer.

Certain embodiments of the present disclosure were described above. It is, however, expressly noted that implementation of the present disclosure is not limited to those embodiments, but rather additions and modifications to what was expressly described herein are also included within the scope of the disclosure. Thus, although embodiments of the present disclosure were described herein in connection with modeling the effect(s) of a seismic load on a structure such as a nuclear reactor, and the critical components thereof, one of ordinary skill in the art will recognize applications of the disclosure for modeling the nonlinearities of loads on dams, office buildings, military bases, sports arenas, bridges, utilities, mining infrastructure, and the like. Further, external loads within the scope of the disclosure include tornados, hurricanes, explosions, vibrations from automobile traffic, and the like.

Applications of the disclosure also go beyond structures, and may include medical applications, such as modeling bones and anatomy under stress, including for diagnostic purposes. Other benefits, uses and applications of embodiments also exist.

Moreover, it is to be understood that the features of the various embodiments described herein were not mutually exclusive and can exist in various combinations and permutations, even if such combinations or permutations were not made express herein, without departing from the scope of the disclosure. In fact, variations, modifications, and other implementations of what was described herein will occur to those of ordinary skill in the art without departing from the scope of the disclosure. As such, the invention is not to be defined only by the preceding illustrative description, but only by the claims which follow, and legal equivalents thereof.

Although each operation illustrated by or in connection with FIGS. 1-3 and accompanying text recites acts performed in a particular order, embodiments of the present disclosure do not necessarily need to operate in that recited order. One of ordinary skill in the art would recognize many variations, including performing acts in parallel, or in a different order.

What is claimed is:

1. An energy management system, the system comprising:
    a system control unit including a processor configured to enable the system control unit to periodically determine a charge/discharge profile for an energy storage device during a demand time window responsive to an energy generation forecast model of a variable energy source and a demand forecast model for a load, wherein the charge/discharge profile for the energy storage device specifies, for each constituent time slot of the demand time window, a charge operation or a discharge operation; and
    a device control unit operably coupled to the energy storage device and including another processor configured to enable the device control unit to control the energy storage device responsive to the charge/discharge profile and adaptively adjust the charge/discharge profile during the demand time window responsive to variations between a forecasted net load and an actual measured net load.

2. The system of claim 1, wherein the system control unit is further configured to determine the charge/discharge profile to cost-optimally use the variable energy source.

3. The system of claim 1, further comprising a graphical user interface configured to receive one or more user-defined constraints associated with the charge/discharge profile.

4. The system of claim 1, wherein the device control unit is further configured to adjust the charge/discharge profile responsive to one or more variations between a net load profile and a measured state of charge of the energy storage device.

5. The system of claim 1, further comprising a smart meter connected to the energy storage device and configured to measure charging and discharging of the energy storage device.

6. The system of claim 1, further comprising a smart meter connected to the load and configured to measure power or energy demand at the load.

7. The system of claim 1, further comprising a smart meter coupled to the variable energy source and configured to measure power or energy generated by the variable energy source.

8. The system of claim 1, further comprising a database comprising historical data of energy generation by the variable energy source and energy consumptions by electrical loads.

9. The system of claim 1, further comprising a controller operably connected to the energy storage device, and configured to control the energy storage device responsive to information received from the device control unit and/or the system control unit.

10. A control unit for adapting operation of a power storage unit, the control unit comprising:
    a communication circuit configured to:
        facilitate communication with other power management devices deployed in a power system;
        receive or calculate an operating schedule for a power storage unit, the operating schedule corresponding to a time interval;
        receive measurements related to performance of the power system during the time interval; and
        transmit control signals to the power storage unit, and
    a processor configured to:
        detect a difference between an expected measurement of the power system and an actual measurement of the power system;
        adaptively adjust the operating schedule responsive to an optimization algorithm configured to attempt to reduce a difference between a desired operation of the power system and an observed operation of the power system by calculating a new operating schedule of the power storage unit; and
        generate the control signals during the time interval responsive to the adjusted operating schedule.

11. The control unit of claim 10, wherein at least one measurement is indicative of power generation at a variable power source.

12. The control unit of claim 11, wherein the at least one measurement is indicative of power demand by a load connected to a power distribution system that includes the power storage unit.

13. The control unit of claim 10, wherein the communication circuit is further configured to receive a second operating schedule corresponding to a second time interval and the processor is further configured to generate control signals during the second time interval responsive to the second operating schedule.

14. The control unit of claim 10, wherein the operating schedule specifies, for each constituent time slot of the time interval, a charge operation or a discharge operation.

15. The control unit of claim 10, wherein the optimization algorithm is configured to attempt to reduce a difference between a desired state of charge of the power storage unit and an observed state of charge of the power storage unit.

* * * * *

UNITED STATES PATENT AND TRADEMARK OFFICE
CERTIFICATE OF CORRECTION

PATENT NO. : 11,404,875 B2
APPLICATION NO. : 15/891704
DATED : August 2, 2022
INVENTOR(S) : Bishnu P. Bhattarai and Kurt S. Myers It is certified that error appears in the above-identified patent and that said Letters Patent is hereby corrected as shown below:

In the Specification
Column 8, Line 21, change "Moreover, $\notin$" to --Moreover, $\in$--

Signed and Sealed this
Eighteenth Day of April, 2023

Katherine Kelly Vidal
*Director of the United States Patent and Trademark Office*